United States Patent [19]

Carlesimo

[11] 4,342,462

[45] Aug. 3, 1982

[54] ADJUSTABLE SEAL MEMBER FOR CONDUIT TO MANHOLE JUNCTION

[76] Inventor: John Carlesimo, 29800 W. 8 Mile Rd., Farmington, Mich. 48024

[21] Appl. No.: 59,028

[22] Filed: Jul. 20, 1979

Related U.S. Application Data

[62] Division of Ser. No. 904,426, May 10, 1978, Pat. No. 4,200,299.

[51] Int. Cl.³ .................. F16J 15/10; F16L 25/00
[52] U.S. Cl. ............................ 277/101; 277/152; 277/207 R; 277/DIG. 2; 285/4
[58] Field of Search ............... 285/4, 177; 277/207, 277/207 A, 99.5, 101, 152, 27, DIG. 2

[56] References Cited

U.S. PATENT DOCUMENTS

| | | | |
|---|---|---|---|
| 3,603,618 | 9/1971 | Stratton | 277/101 |
| 3,973,783 | 8/1976 | Skinner et al. | 277/207 A |
| 4,103,901 | 8/1978 | Ditcher | 277/277 A |
| 4,199,157 | 4/1980 | Skinner | 277/101 |
| 4,211,423 | 7/1980 | Resech | 285/4 |

Primary Examiner—Robert I. Smith
Attorney, Agent, or Firm—Hauke and Patalidis

[57] ABSTRACT

An adjustable seal member for effecting a leak-proof junction between a conduit and an opening in the sidewall of a manhole well in an underground sewer installation. The seal member, made of elastomeric material, is in the form of a flanged sleeve which is disposed about the periphery of the conduit and which is clamped over the conduit by means of a steel strap clamp. The flange is embedded in the concrete or cement of the manhole well structure in the edge of the opening in the manhole. The sleeve is adjustable to diverse conduit sizes within a range by having a plurality of increasing internal diameter portions for fitting conduits of different outer diameters within the range to insure relatively close fit between the internal surface of the sleeve and the external surface of the conduit. In the alternative, the sleeve is provided with a flap integrally formed with the remaining of the sleeve body and with a pyramidal integral portion which can be folded over to adjust the internal diameter of the sleeve to an appropriate conduit size. The invention further contemplates providing a seal member with a sleeve portion on both sides of the flange for clamping the second sleeve portion over the conduit in the inside of a manhole well.

2 Claims, 13 Drawing Figures

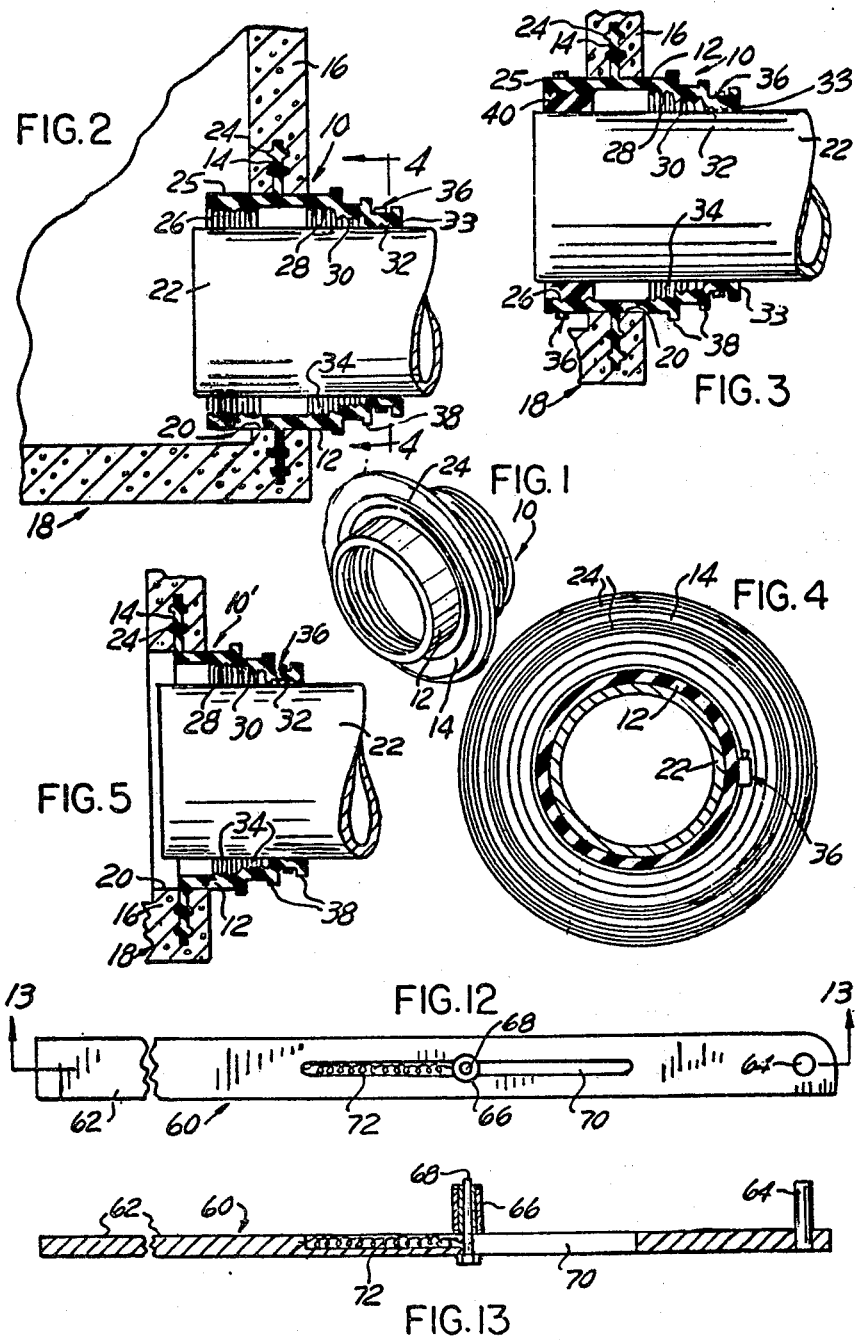

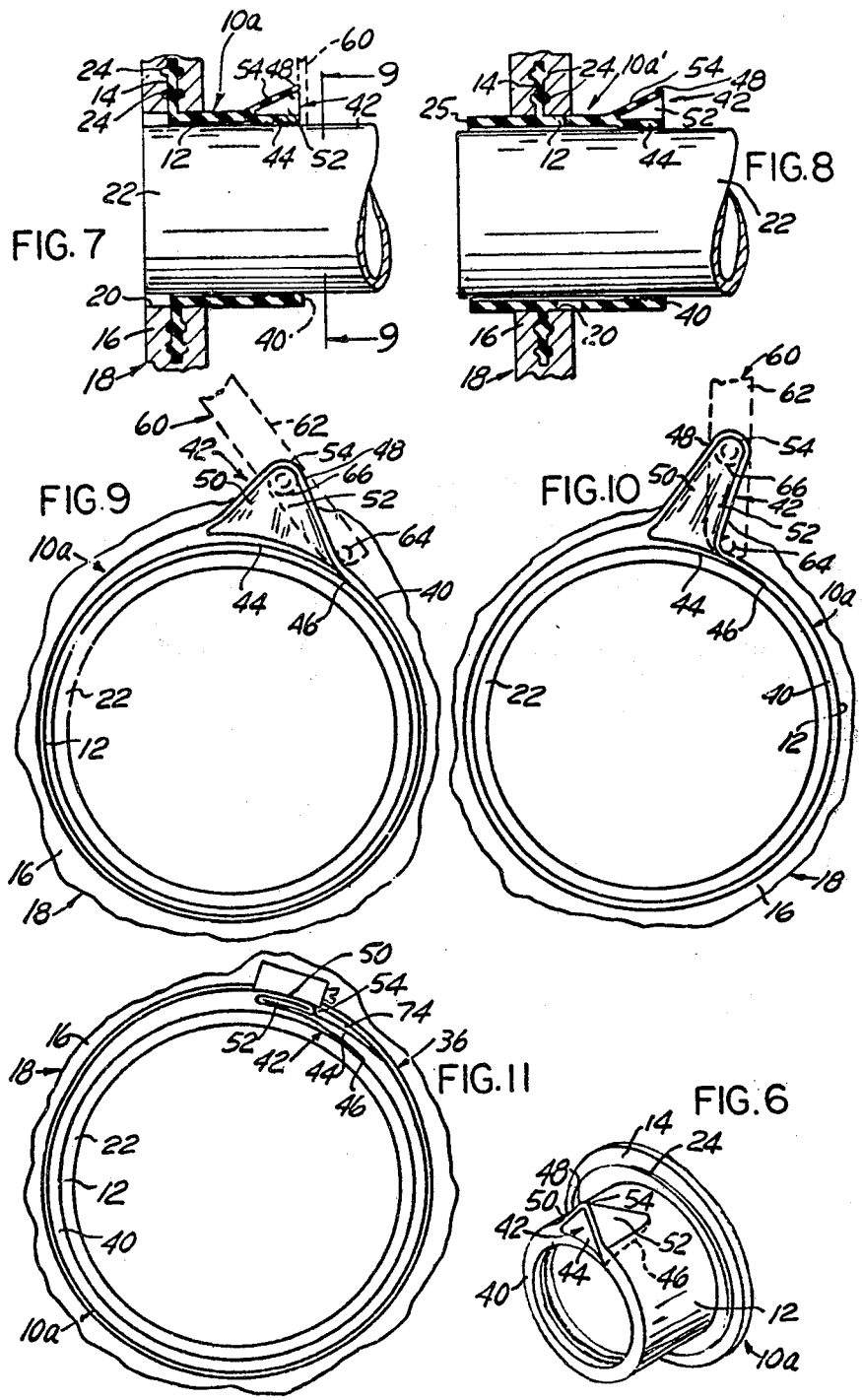

ADJUSTABLE SEAL MEMBER FOR CONDUIT TO MANHOLE JUNCTION

This is a division of application Ser. No. 904,426, filed May 10, 1978, now U.S. Pat. No. 4,200,299.

BACKGROUND OF THE INVENTION

The invention relates to a seal member for effecting a leak-proof joint between an underground conduit and a structure such as a manhole well.

Different methods have been used in the past for effecting a coupling seal between an underground pipe or conduit and a manhole well provided with an aperture through which the end of the conduit is passed for leading to the interior of the manhole well. Such couplings may be effected by means of a bell-shaped packing or seal closely fitting the peripheral surface of the conduit and partially embedded in concrete or cement poured around the seal at the junction between the conduit and the aperture in the manhole well, or by forcing a packing into the space between the peripheral surface of the conduit and the edge of the aperture. Couplings of this type are disclosed in U.S. Pat. Nos. 2,087,752, 2,657,079, 3,591,190, 3,744,806, 3,787,061, 3,879,067 and 3,348,850.

Another method for effecting a seal between a conduit and a manhole well consists in placing a flanged seal member through the manhole well opening and clamping the flange over the aperture or embedding it in concrete or cement, the sleeve or boot portion of the seal member projecting outwardly from the manhole well opening. The end of the conduit is passed through the sleeve and the sleeve is clamped against the peripheral surface of the conduit by means of a steel strap clamp. A coupling of this type is disclosed in U.S. Pat. No. 3,759,280.

Underground conduits, usually made of clay, concrete, asbestos, plastic, such as polyvinyl chloride, or sometimes cast iron, generally have a rough outer surface, and are subject to wide variations in roundness and in outer diameter size dimensions. Often, conduits of a desired size are not immediately available on the market, and a contractor may be forced to utilize underground conduits of a slightly different outside diameter than the one contemplated.

Furthermore, it often happens that through use and aging, and due to settling of the ground in which an underground sewer system is buried, that bending moments and sheer forces are applied at the joints between the conduits and the manhole well openings causing undesired leakage from the manhole well to the surrounding ground or from the surrounding ground into the manhole well.

SUMMARY

The inconveniences and shortcomings of the prior art are remedied by the present invention which provides an elastomeric seal member forming a junction between a manhole well opening and the conduit fitted to that opening, which is adjustably adaptable to variations in conduit outer diameter sizes for insuring a relatively close fit between the seal member inner surface and the conduit outer surface and which, in a modification thereof, permits to re-establish a leak-proof seal within the manhole well without excavating the ground in the event that the leak-proof joint deteriorates with the passage of time.

The present invention accomplishes its purposes by providing a seal member in the form of a flanged sleeve made of elastomeric material. The flange portion of the seal member, preferably provided with projecting annular ribs, is normally embedded in cement or concrete in the manhole well opening, and is molded integrally with a sleeve portion projecting outwardly of the manhole well structure for clamping by means of a strap or ring clamp about the periphery of the conduit. The sleeve internal diameter progressively decreases in steps and by small increments, such as to provide a relatively close fit with the peripheral surface of conduits of various outer diameter sizes within a range, the smaller diameter portion or portions of the sleeve being removed when it is necessary to accommodate a conduit of an outside diameter corresponding to a larger diameter section of the sleeve. Alternatively, the sleeve is provided with a lip portion, proximate its end, whose diameter is adjustable within a range, as a result of being provided with an integral flap portion and a folded over portion conforming to the diameter of the conduit, after which the flap and the folded over portion, together with the rest of the sleeve lip, are clamped over the conduit by means of a steel strap clamp.

In addition, the present invention contemplates providing a sealing member having an inwardly projecting integral sleeve portion, that is a portion projecting inwardly into the manhole well, permitting to re-establish a leak-proof seal in the event that the portion of the sleeve projecting to the outside of the manhole well becomes damaged, or that the corresponding clamp is damaged, or that, for any other reason, leakage develops.

The many objects and advantages of the invention will become apparent to those skilled in the art when the following description of the best mode contemplated for practicing the invention is read in conjunction with the accompanying drawing wherein:

BRIEF DESCRIPTION OF THE DRAWING

FIG. 1 is a perspective view of an example of conduit to manhole opening seal member according to the present invention;

FIG. 2 is a longitudinal section of the seal member of FIG. 1 illustrated in position in a manhole opening for effecting a seal between a conduit and the interior of a manhole well;

FIG. 3 is a view similar to FIG. 2 but showing the seal member of the invention in use for effecting a seal with a conduit in the inside of a manhole well;

FIG. 4 is a transverse section from line 4—4 of FIG. 2.

FIG. 5 is a view similar to FIG. 2 but showing a modification of the invention;

FIG. 6 is a perspective view of a further modification of the invention;

FIG. 7 is a longitudinal section through the seal member of FIG. 6 illustrated in position in a manhole well opening with a conduit disposed therethrough;

FIG. 8 is a view similar to FIG. 7 but showing a modification thereof;

FIG. 9 is an end view from line 9—9 of FIG. 7 showing the lip of the seal member of FIG. 7 in the process of being tightened about the periphery of the conduit;

FIG. 10 is a view similar to FIG. 9 and showing the relative position of the elements of the seal member with the lip thereof in engagement with the peripheral surface of the conduit;

FIG. 11 is a view similar to FIG. 10 but showing the seal member of the invention clamped about the periphery of the conduit;

FIG. 12 is a plan view of a tool for tightening the lip of the seal member of FIGS. 7-11 about the periphery of a conduit; and FIG. 13 is a longitudinal section thereof at line 12—12 of FIG. 12.

DETAILED DESCRIPTION OF THE PREFERRED EMBODIMENTS

Referring to FIGS. 1-4, a sealing member 10 for a manhole well opening to a conduit seal, according to the present invention, is in the form of a tubular body comprising a sleeve 12, molded of elastomeric material, provided with an integral outwardly flared annular flange 14. As shown at FIGS. 2 and 3 the annular flange 14 of the seal member 10 is normally embedded in the concrete or cement of the wall 16 of a manhole well 18 surrounding an opening 20 through the wall. The end of a conduit 22 is placed through the sleeve 12. In order to provide a good anchorage in the concrete of the manhole well 16, and an effective dam against water seepage, the seal member annular flange 14 is provided with a plurality of concentric ribs 24 on both its faces. One end 25 of the sleeve 12 projects on the inside of the manhole well 18 and is provided internally with parallel ribs 26. The other end of the sleeve 12, that is the end projecting outside of the manhole well 18, is formed with successive step-like integral portions of diameter progressively decreasing by increments, three of which are illustrated in the drawing, as shown at 28, 30 and 32, all preferably also provided internally with parallel ribs 34.

In the configuration illustrated at FIGS. 2 and 3, the outside diameter of the conduit 22 fits the smaller inner diameter portion 32 of the outwardly projecting sleeve portion of the seal member 10, and an adjustable clamp 36, in the form of an adjustable steel band or strap, tightens the lip 33 of the outwardly projecting portion of the sleeve 12 of the seal member 10 about the peripheral surface of the conduit 22. Radially projecting parallel annular ribs 38 may be formed on the peripheral surface of the sleeve 12 proximate the lip 33, each pair of annular ribs corresponding to an internal diameter section 28, 30 and 32, and aiding in holding an appropriate clamping adjustable strap 36 in position.

It is readily apparent that if a conduit 22 having an outside diameter slightly larger than that illustrated in the drawing is used, the smallest diameter portion 32 of the sleeve 12 is cut off, either alone or together with the intermediary diameter portion 30 if necessary, so as to fit properly with a small clearance the peripheral surface of the conduit 22, after which a clamping strap band 36 is placed over the periphery of the sleeve 12 and appropriately tightened.

Once an installation, such as a sewer system consisting of conduits laid in trenches leading from and into diverse manhole wells, has been buried underground and has been operating for a certain period of time under adverse conditions, undesired leakages from the manhole wells to the soil surrounding the manhole wells, or from the soil into the manhole wells may develop. With conventional manhole well openings to conduit sealing devices, when such a leakage occurs it is either ignored or, if it is desired to repair the damages, the ground must be excavated to reach a conduit to manhole well seal, and the seal repaired or changed.

The structure of the seal member 10, illustrated at FIGS. 1-3, permits to effectuate such repair without excavating or, in the alternative, it permits to provide each conduit to manhole opening junction with a double seal arrangement when the sewer system is first built. For that purpose, it is only necessary to initially install the conduit 22 through the manhole opening 20 such that the end of the conduit 22 projects within the manhole well 18 a distance corresponding approximately to the distance to which the end 25 of the seal member sleeve 12 projects within the manhole well 18. With a conduit 22 having an outside diameter corresponding substantially to the larger inner diameter portion 28 of the sleeve 12, undesirable leakage is stopped by placing a clamping strap 36 about the periphery of the sleeve 12 proximate its end 25, and tightening the clamp. A second, inner seal is thus effected between the conduit 22 and the seal member 10. In installations using a conduit 22 having an outside diameter corresponding to the inner diameter portions 30 or 32 of the sleeve, an annular gasket 40, FIG. 3, is interposed between the peripheral surface of the conduit 22 and the inner surface of the sleeve 12, proximate its end 25, before tightening the clamping strap 36.

FIG. 5 illustrates a seal member 10' similar to the seal member 10 of FIGS. 1-4, wherein, however, the portion of the sleeve 12 projecting within the manhole well 18 is omitted, the sleeve 12 ending flush with the integral annular flange 14.

The seal members 10a and 10a' illustrated at FIGS. 6-11 are also molded of elastomeric material, have a body forming a sleeve 12 provided with an integral annular flange 14 preferably provided with concentric annular ribs 24 for embedding in the concrete of the wall 16 of a manhole well 18 surrounding an opening 20 in which is disposed a conduit 22. The sleeve 12 projects to the outside of the manhole well 18 around the conduit 22, and is provided with a lip 40 having an adjustable portion 42. The adjustable lip portion 42 comprises an underlying integral flap 44 having a slanted edge 46, FIG. 6, relative to the longitudinal axis of the sleeve 12, which is disposed about a portion of the periphery of the conduit 22, and which is bridged by a continuous portion of the wall of the sleeve 12 forming a pyramidal appendage 48. The integral pyramidal appendage 48 is defined by two integral triangular panels 50 and 52 joined at an apex 54 rearwardly tapering towards the peripheral surface of the sleeve 12.

For the purpose of applying the lip 40 and the corresponding inner surface of the sleeve 12 firmly against the peripheral surface of the pipe 22, a tool 60, illustrated in detail at FIGS. 12-13, is used for folding over the pyramidal appendage 48. The tool 60 comprises a steel bar 62 provided with a fixed pin 64 at one end and a longitudinally displaceable rotatable roller 66 proximate that end. The roller 66 is mounted on a support shaft 68 longitudinally slidable in a slot 70 and constantly pulled away from the pin 64 by a coil spring 72. In use, and as schematically illustrated at FIGS. 9-10, the roller 66 of the tool 60 is placed within the pyramidal appendage 48 on the inside of the apex 54 thereof, the pin 64 is engaged with the outer surface of the triangular panel portion 52 at its junction with the remaining of the body of the sleeve 12, as shown at FIG. 9, and the end of the bar 62 of the tool 60 is pulled clockwise to fold the triangular panel 50 over the triangular panel 52 while pulling the interior surface of the sleeve 12 proximate the lip 40 thereof in tight engagement with the peripheral surface of the conduit 22, the pulling pressure being dependent on the leverage exerted by the length of the bar 62 and the strength of the spring 72. Once the triangular panels 50 and 52 are folded over one another, the flap 44 and the internal surface of the sleeve 12 proximate the lip 40 are in tight engagement with the peripheral surface of the conduit 22, and one or more clamping straps 36, FIG. 11, are tightened around the periphery of the sleeve 12. The inner surface of the strap of the clamp 36 is preferably provided with a wedge element 74 integral therewith, or a separate wedge member 74 is placed below the strap so as to fill the wedge-shaped space between the apex 54 of the folded over triangular panels 50 and 52 and the peripheral surface of the sleeve 12 proximate the lip 40.

It can thus be seen that the seal member 10a of FIGS. 6-11 has a lip 40 which is adjustable to diverse conduit outside diameters, within a range. If it is desired to provide the seal member 10a with the added feature of permitting to re-establish a leak-proof seal from the inside of a manhole well, the sealing member structure 10a' of FIG. 8 is used, having a sleeve 12 with a portion having an end 25 projecting through the manhole well opening 20 to the interior of the manhole well 18, such that a clamping strap, not shown, can be placed over the periphery of the sleeve 12 on the inside of the manhole well, proximate the end 25 of the sleeve and tightened to effectuate a sealing engagement between the internal surface of the sleeve proximate the end 25 and the periphery of the portion of the conduit 22 projecting within the manhole well 18, without or with a gasket interposed, as the case may be depending on the outer diameter of the conduit 22.

It will be appreciated that the outwardly flared annular flange 14 of every embodiment of the invention may be clamped over the surface of the wall 16 of the manhole well 18 surrounding the opening 20, either on the inside or on the outside of the manhole well by means of an appropriate clamping ring and appropriate studs and nuts, not shown, instead of being embedded in concrete or cement as described and illustrated.

Having thus described the present invention by way of examples of structural embodiments thereof, modification whereof will be apparent to those skilled in the art, what is claimed as new is as follows:

1. In a junction between a manhole well and a conduit having a generally cylindrical peripheral surface and an end disposed within an opening in a wall of said manhole well projecting within said manhole well, a one-piece seal member having a substantially cylindrical tubular body of elastomeric material comprising a sleeve having a first end portion projecting outwardly from said opening in clamped sealed relationship to the peripheral surface of said conduit and an integral outwardly flared annular flange in sealing engagement with the edge of said opening, wherein the first end portion of said sleeve in clamped sealed relationship to the peripheral surface of said conduit has an internal diameter adjustable within a range to conform to the outer diameter of said conduit, said first end portion of said sleeve comprising a plurality of contiguous integral stepped annular portions of decreasing external and internal diameters from proximate said flange to the end of said end portion, a plurality of substantially parallel annular ribs peripipherally integrally formed on said end portion, each pair of adjacent ribs corresponding to one of said decreasing external and internal diameter annular portions and defining a holding means therebetween for an adjustable strap clamping said end portion to the peripheral surface of said conduit and a plurality of circular parallel ribs integrally formed on the internal surface of each of said stepped portions, said sleeve further comprising a second end portion projecting within said manhole well surrounding the end of said conduit projecting within said manhole well, and means for clamping said sleeve second end in sealed relationship to the peripheral surface of said end of said conduit projecting within said manhole well.

2. The seal member of claim 1 wherein said means for clamping said sleeve second end comprises an adjustable strap clamping said sleeve second end to the peripheral surface of said conduit and projecting within said manhole well, and an annular gasket optionally disposed around said peripheral surface for compensating for difference in size between said conduit and said sleeve second end.

* * * * *